United States Patent [19]

Akamatsu

[11] 4,310,791
[45] Jan. 12, 1982

[54] INDUCTION MOTOR CONTROL SYSTEM

[75] Inventor: Masahiko Akamatsu, Amagasaki, Japan

[73] Assignee: Mitsubishi Denki Kabushiki Kaisha, Tokyo, Japan

[21] Appl. No.: 141,214

[22] Filed: Apr. 17, 1980

Related U.S. Application Data

[63] Continuation of Ser. No. 873,663, Jan. 30, 1978, abandoned.

[30] Foreign Application Priority Data

Feb. 1, 1977 [JP] Japan .................................. 52-10369

[51] Int. Cl.³ ........................... H02P 5/34; H02P 7/42
[52] U.S. Cl. ................................... 318/800; 318/808; 318/809; 318/812
[58] Field of Search .............................. 318/798–803, 318/806–812

[56] References Cited

U.S. PATENT DOCUMENTS 3,700,986 10/1972 Cushman et al. .................. 318/800

Primary Examiner—J. V. Truhe
Assistant Examiner—Eugene S. Indyk
Attorney, Agent, or Firm—Robert E. Burns; Emmanuel J. Lobato; Bruce L. Adams

[57] ABSTRACT

A variable frequency power supply device supplies an AC power to a squirrel-cage motor through an AC parameter control. The control receives a command active current resulting from a command torque and a command exciting current to generate a resultant current and its phase. The command torque is produced from the actual and command motor speeds and the exciting current is caused from the actual motor speed. The control also receives a command frequency determined by the actual motor frequency and a command slip frequency also resulting from the command torque. The control controls the firing phases of thyristors in the power supply device in response to the command current, phase and frequency. The control may generate a voltage for supplying the active current and an exciting voltage to similarly control the firing phases of the thyristors. In the latter case, the exciting voltage may be added with its differential to compensate for a rapid change in active current.

5 Claims, 17 Drawing Figures

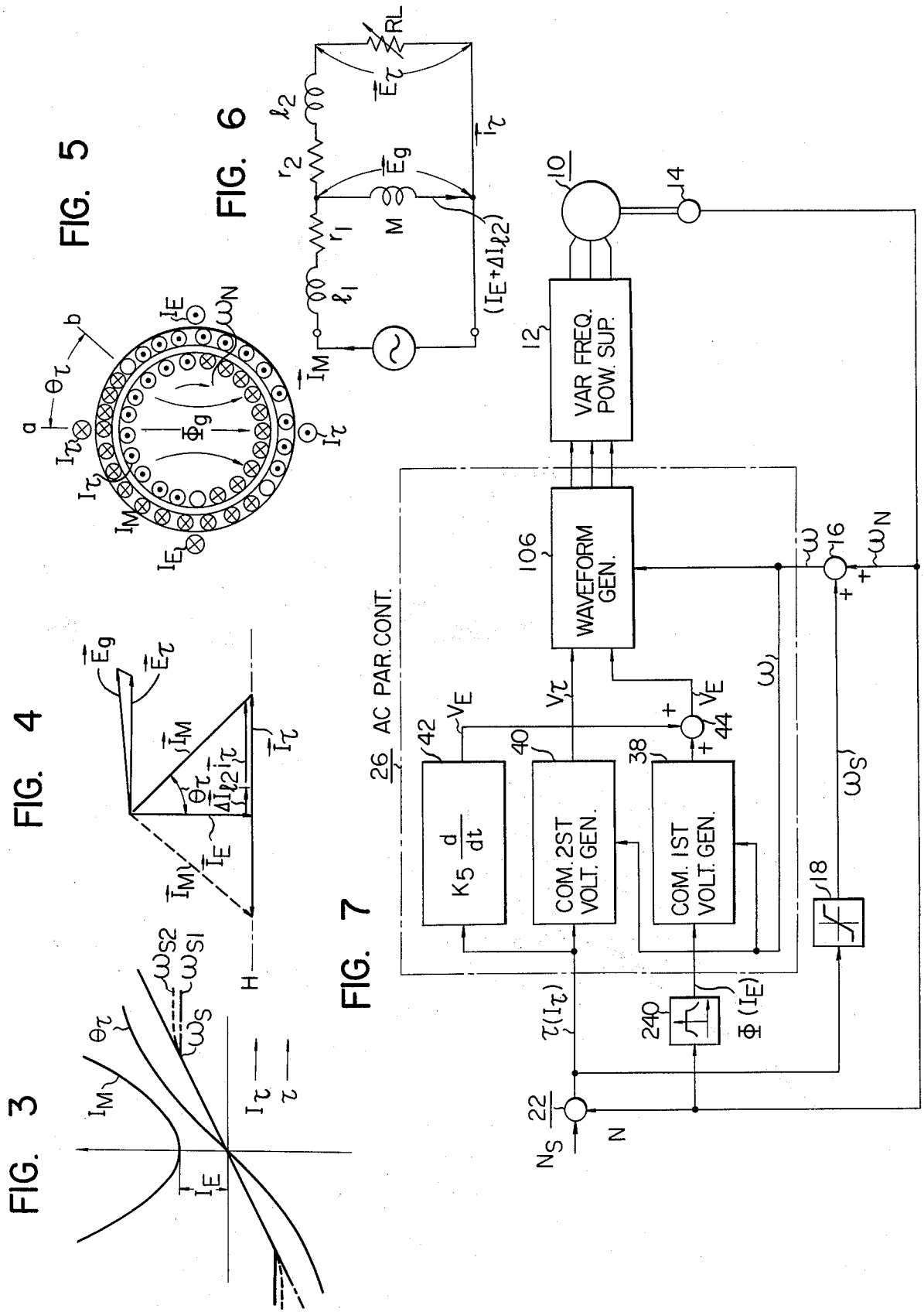

INDUCTION MOTOR CONTROL SYSTEM

This is a continuation, of application Ser. No. 873,663, filed Jan. 30, 1978 and now abandoned.

BACKGROUND OF THE INVENTION

This invention relates to a control system for controlling a frequency of an AC power supplied to a primary winding of an induction motor including a shortcircuited secondary conductor, for example, a squirrel-cage motor.

In conventional induction motor control systems the variable frequency power supply device, for example, the inverter or cyclo-converter has supplied an electric power to an induction motor with a shortcircuited secondary conductor, typically, to a squirrel-cage motor so that the electric power has a frequency as determined by the algebraic sum of an output from a command slip frequency generator responsive to a command torque and an output from a speed sensor for the motor. A voltage for supplying the electric motor is proportional to the absolute value of the frequency thus determined. Such control systems have more or less improved the characteristics of the generated torque but the slip of the motor does not fast respond to the required torque. In addition, an air gap flux on the motor has been changed and long time has gone until this change in gap flux is settled.

In order to solve those problems, the motor has been provided with an air gap-magnetic sensor thereby to control the AC power supply to the motor in response to the sensed position of the gap flux or a phase of an internal electromotive force. This measure has resulted in a complicated, expensive structure.

It is an object of the present invention to provide a new and improved induction motor control system for controlling a frequency of electrical energy supplied to a primary winding of an induction motor including a shortcircuited secondary conductor, having a fast response and a simple circuit configuration without the necessity of providing a gap flux sensor and subordinate controls.

SUMMARY OF THE INVENTION

The present invention provides an induction motor control system comprising variable frequency power supply means for supplying an AC power to a primary winding of an induction motor including a shortcircuited secondary conductor, slip frequency control means for controlling a frequency of the AC power and a slip frequency of the induction motor, a command slip frequency generation means for generating a command value of the slip frequency in response to a required torque, and AC parameter control means for commanding and controlling the absolute value and phase angle of the AC power in connection with the slip frequency whereby the power supply is controlled independently of a gap flux on the induction motor.

In a preferred embodiment of the present invention, the AC parameter control means may include a first function generator for generating a command absolute value of the supplied alternating current in connection with the command slip frequency, and a second function generator for generating a command phase angle of the supplied alternating current in connection with the command slip frequency means.

In the voltage controlled power supply, the AC parameter control means may include two function generators for generating a first voltage component and a second voltage component respectively, and a differentiating and adding means for differentiating the second voltage component with respect to time and for adding the differentiated second voltage component to the exciting voltage.

BRIEF DESCRIPTION OF THE DRAWINGS

The present invention will become more readily apparent from the following detailed description taken in conjunction with the accompanying drawings in which:

FIGS. 3 and 4 are respectively a graph of three AC parameters and a vector diagram useful in explaining the principles of the present invention;

FIG. 5 is a schematic diagram of space conductor current distributions for a primary and a secondary current flowing through an induction motor controlled by the present invention;

FIG. 6 is a diagram illustrating the simplified equivalent circuit to induction motors including the shortcircuit secondary conductor;

FIG. 7 is a block diagram of a modification of the present invention;

FIG. 10b is a circuit diagram of the solid state switch shown in FIG. 10a;

DESCRIPTION OF THE PREFERRED EMBODIMENTS

Figure 1A:
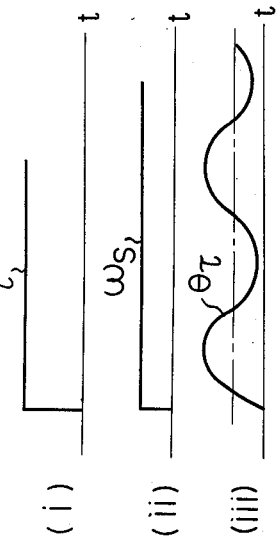
FIG. 1a is a block diagram of a conventional induction motor control system.

In a conventional induction motor control system shown in FIG. 1a an induction motor 10 includes a primary winding (not shown) supplied by a variable frequency power supply device 12 and a shortcircuited secondary conductor (not shown). The induction motor 10 in this case is a squirrel-cage motor while the supply device 12 may be an inverter or a cyclo-converter. In this case, the torque control of the motor 10 has exhibited the complicated nonlinear response characteristics because of the presence of the shortcircuited secondary conductor. That is, as compared with DC motors or commutator-less motors employing synchronous motors, the generation of a torque has been attained with a time lag, and the generated torque has changed in an oscillatory manner. Accordingly conventional variable frequency control systems for induction motors have been unsuitable for its use requiring a fast response.

In order to eliminate the abovementioned objections, the arrangement illustrated in FIG. 1a has comprised an adder 16 receiving both an output $\omega_N$ from a speed detector 14 such as a tacho-generator connected to the motor 10 and an output $\omega_S$ from a command slip frequency generator 18 applied with a command torque $\tau$ to produce the algebraic sum $\omega$ of both outputs that, in turn, determines a frequency $\omega$ of an electric power supplied to the motor 10. The algebraic sum $\omega$ is applied to both the variable frequency power supply device 12 and a voltage generator 20 acting as a square law detector which generate a voltage $V_M$ proportional to the absolute value of the frequency $\omega$. Thus the power supply device 12 controls the induction motor 10 in response to the voltage $V_M$ and the frequency $\omega$ applied thereto. This measure is known as a slip frequency control system.

Figure 1B:
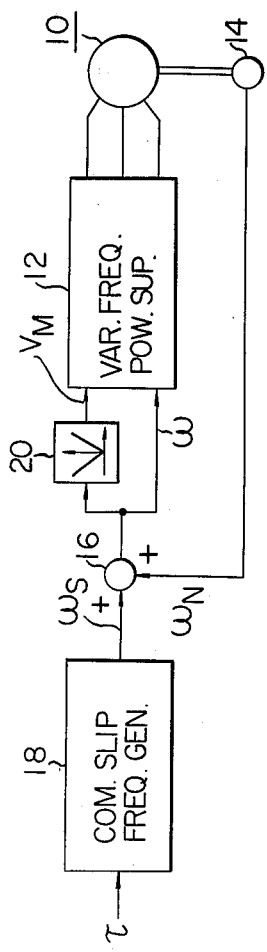
FIG. 1b is a graph useful in explaining the operation of the arrangement shown in FIG. 1.

Conventional slip frequency control systems such as shown in FIG. 1a have been disadvantageous in that an angle governing a torque does not fast respond to a change in torque. The term "angle governing a torque" means a deviation angle of a primary from a secondary current distribution. More specifically, when a command torque $\tau$ changes stepwise as shown in FIG. 1b(i), an angular slip frequency $\omega_S$ immediately respond to the torque as shown in FIG. 1b(ii) but a change in angle $\theta_\tau$ that is an integrated value of the slip frequency $\omega_S$ oscillates with the system natural frequency as shown in FIG. 1b(iii). That natural frequency is determined by both a coefficient of generation of a steady-state torque and the system inertia, and the oscillation decays as determined by a secondary resistance and inductance of the particular induction motor. The term "secondary inductance" used herein means a leakage inductance as viewed from the secondary side of the induction motor for voltage controlled power supply devices connected to voltage sources, or a self-inductance on the secondary side thereof for current control type power supply devices connected to current sources. Frankly speaking, a magnetic flux flowing through the particular motor in this oscillation has not been changed within a short time interval because of the presence of the short-circuit of the secondary conductor thereof and acted on transient phenomena relatively short in duration as if it would resemble the magnet rotor of synchronous motors. Therefore excessive power swings have occurred as in synchronous motors. In additions, a change has occurred in an air gap-magnetic flux and long time has gone until this change is settled.

Also in order to solve the problems just described, there have been previously proposed systems including gap flux sensor means and controlling a power supplied to the induction motor in response to a position of the sensed gap flux or a phase of an internal electromotive force. Those systems, however, have been complicated and expensive in sensing the magnetic flux.

Accordingly, the present invention contemplates to provide an induction motor control system having a simple construction and a fast response without the necessity of using gap flux sensor means and subordinate controls.

Figure 2:
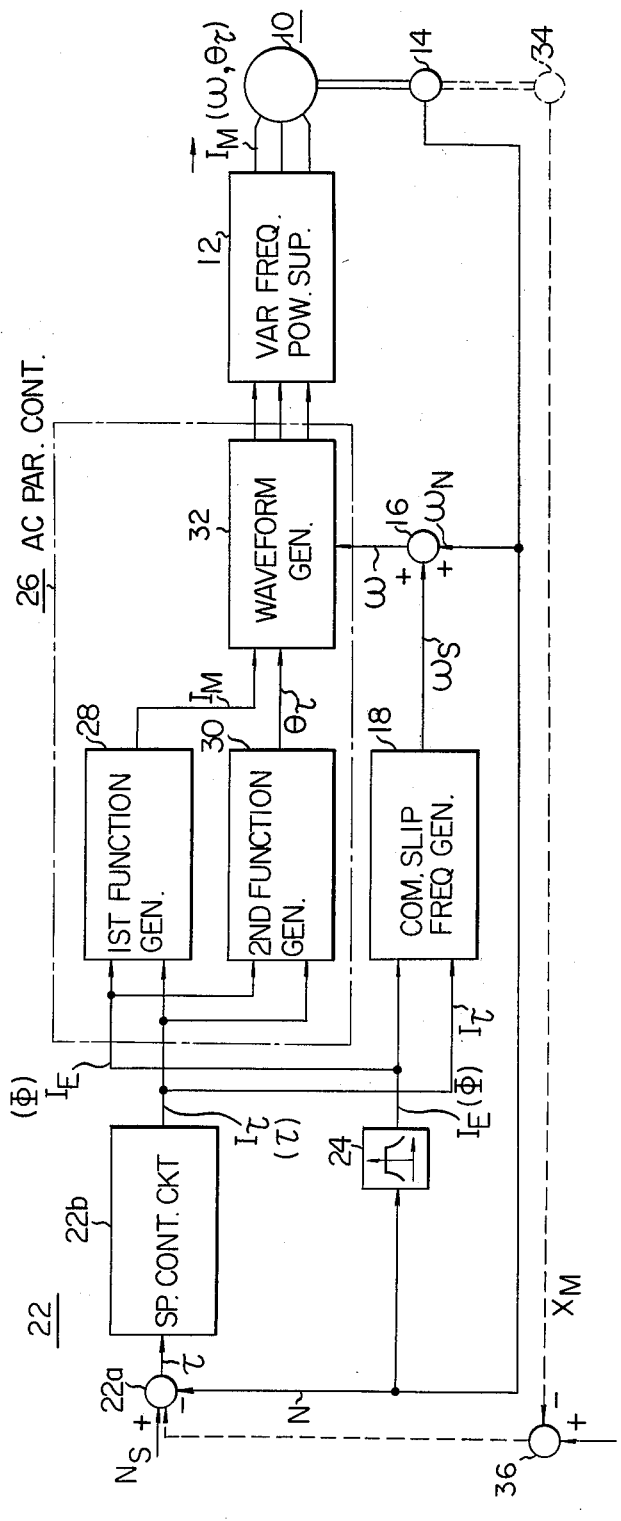
FIG. 2 is a block diagram of an embodiment according to the induction motor control system of the present invention.

FIG. 2 wherein like reference numerals designate the components identical or corresponding to those shown in FIG. 1a illustrates an embodiment of the present invention employing a current controlled power supply device. A command speed $N_S$ and the actual speed N from the speed sensor 14 are applied to a comparator 22a where the actual speed N is subtracted from the command speed $N_S$ to form a command torque $\tau$. The command torque $\tau$ is applied to a block 22b forming a speed control circuit generally designated by the reference numeral 22 with the comparator 22a. The block 22b is responsive to the torque $\tau$ to generate a command active current component $I_\tau(\tau)$ corresponding to the desired torque $\tau$. That active current component $I_\tau(\tau)$ is supplied to the command slip frequency generator 18.

Also a command excitation generator 24 is responsive to the actual speed N applied thereto to generate a command exciting current $I_E$ corresponding to a gap flux $\Phi$ in a high speed range. The command exciting current $I_E$ is supplied to the command slip frequency generator 18 where it along with the active current component $I_\tau$ is converted to a command angular slip frequency $\omega_S$. That slip frequency $\omega_S$ is supplied to the adder 16 with the actual angular rotating frequency $\omega_N$ supplied also from the speed sensor 14 to provide a command angular frequency $\omega$. Thus the adder 16 serves as a command frequency generator.

The term "angular rotating frequency" means an angular frequency into which a rotational speed is converted and which gives an synchronous speed equal to the rotational speed. The angular frequency may be called merely a "frequency" hereinafter.

As shown in FIG. 2, the speed control circuit 22, the command excitation generator 24 and the command frequency generator 16 are connected to a three AC parameters-control circuit 26. The three AC parameter control circuit 26 includes a first function generator 28, a second function generator 32 and a polyphase AC waveform generator 32 connected to both function generators 28 and 30.

The active current component $I_\tau$ from the speed control circuit 22 and the command exciting current component $I_E$ from the command excitation generator 24 are applied to the first function generator 28 where a command fed current $I_M$ is generated. The command current $I_M$ is a composition of the active and exciting current components $I_\tau$ and $I_E$ respectively and holds the expression $$I_M = K_1 \sqrt{I_E^2 + I_\tau^2} \tag{1}$$

where $K_1$ designates a proportional constant. It will readily be understood that, under the constant flux conditions that the exciting current component $I_E$ remains unchanged, $I_E$ may be also regarded as a proportional constant.

The second function generator 30 also receives the active current component $I_\tau$ and the exciting current component $I_E$ to form a command phase angle $\theta_\tau$ which is imparted to the composed current $I_M$. That is, $\theta_\tau$ designates a phase angle of the composed $I_M$ current on the basis of the exciting current component $I_E$ and satisfies the following expression:

$$\theta_\tau = \tan^{-1} I_\tau / I_E \tag{2}$$

Further the expression $$\omega_S = K_2 I_\tau / I_E \tag{3}$$

is held by the command slip frequency $\omega_S$ provided by the command slip frequency generator 18 where K$_2$ designates a proportional constant. Considering a magnetic saturation, K$_2$ changes with either I$_E$ or I$_\tau$ and particularly with I$_E$ so that the more the magnetic saturation the greater the K$_2$ will be.

FIG. 3 graphically shows the above expressions (1), (2) and (3) labelled I$_M$, $\theta_\tau$ and $\omega_S$ respectively, with I$_\tau$ or $\tau$ plotted in abscissa. It is desirable that the slip frequency $\omega_S$ will be saturated in a high torque region and in either of the motoring and braking modes of operation as shown at dotted-and-dashed line $\omega_{S1}$ (which indicates a flat saturation curve) or at dotted line $\omega_{S2}$ (which indicates a square root-proportional curve) in FIG. 3. This is because the induction motor 10 has a power factor rather reduced with excessively high slips:

FIG. 4 is a vector diagram illustrating the exciting current component I$_E$, the active current component I$_\tau$, the fed current I$_M$ as above described. In FIG. 4, the induction motor produces a motoring torque $\tau$ in the motoring mode of operation illustrated in their first quadrant of FIG. 4 and a braking torque $\tau$ in the braking mode of operation illustrated in the fourth quadrant thereof. The torque is positive when the motor is operated in the motoring mode and negative when operated in the braking mode. Also, the exciting current $\vec{I_E}$ and an internal electromotive force E$_\tau$ are put in quadrature relationship and remain unchanged as reference vectors. Further the exciting and active current components I$_E$ and I$_\tau$ are put in quadrature relationship. When the torque $\tau$ or the active current component I$_\tau$ is changed, the extremity of the composed current I$_M$ depicts a straight line H—H perpendicular to the exciting current component $\vec{I_E}$ while an angle between the exciting current $\vec{I_E}$ and the current $\vec{I_M}$ or the command phase $\theta_\tau$ changes.

Referring back to FIG. 2, the command supplied current I$_M$ and the command phase $\theta_\tau$ thereof are applied to the polyphase AC waveform generator 32 which also receives the command frequency $\omega$ from the command frequency generator 16. Then the polyphase AC waveform generator 32 applies to the power supply device 12 command AC information or the three command parameters or the command absolute value |I$_M$|, the command phase angle $\theta_\tau$ and the command frequency $\omega$. In this case, the device 12 serves a power stage which, in turn, supply a command alternating current I$_M$ having the three command parameters to the induction motor 10 thereby to drive the latter as commanded.

While the present invention has been illustrated and described in conjunction with the current control type it is to be understood that the same is equally applicable to the voltage control type. In the latter case, a voltage controlled power supply device is used, and the first function generator 28 is modified to generate a command fed voltage V$_M$ while the command excitation generator 24 is arranged to generate a command first voltage component V$_E$ for forming the command exciting current I$_E$ with the active current I$_\tau$ replaced by a command second voltage component V$_\tau$ for forming the same. Thereby the process as above described is repeated.

Further if it is desired to effect the positional control then a position sensor 34 is connected to the speed sensor 14 and hence to the induction motor 10. The actual position X$_M$ of the motor 10 sensed by the position sensor 34 is delivered to a position comparator 36 where it is substracted from a command position X applied to the comparator 36. A difference between the command and actual position X and X$_M$ respectively is applied as an equivalent to a command speed N$_S$ to the speed comparator 22a. Thereafter the process as above described is repeated.

The induction motor 10 controlled in the manner as above described has current distributions for a primary and a secondary current flowing therethrough as shown in FIG. 5. In FIG. 5 an outer circular array of circles shows a space distribution of the primary current or fed current I$_M$ to the primary side and an inner circular array of circles shows that of a secondary current i$_\tau$ flowing through the secondary side. The arrow $\Phi_g$ designates a direction of distribution of a gap flux flowing through an associated secondary conductor and iron core on the secondary side. The primary current I$_M$ is resolved into the exciting current component I$_E$ and the active current component I$_\tau$ which are, in turn, shown typically by lumped conductors labelled the corresponding reference characters I$_E$ and I$_\tau$ respectively. Also the crosses indicate currents flowing into the plane of FIG. 5 and the dots indicate currents flowing out from that plane. The fed phase angle $\theta_\tau$ is shown in FIG. 5 as being a angle between the central axis of the gap flux or a magnetic axis a of the exciting current I$_E$ distribution and a magnetic axis b of the supplied or composed current I$_M$ distribution which angle has been called previously the angle governing the torque or the deviation angle of the primary from the secondary current distribution. Also, a direction of rotation is shown at the arrow $\omega_N$.

Where a rapid change in torque is required, the control as above described is effected so that the exciting current component I$_E$ remains unchanged while a phase angle thereof and, in turn, the magnetic axis b thereof is maintained to coincide with the central axis of the gap flux $\Phi_g$. Further the induction motor is applied with that component of the primary current inducing a secondary current i$_\tau$ for producing the command torque $\tau$, that is to say, the active current component I$_\tau$ and the latter is caused to change rapidly. In addition, the command slip frequency $\omega_S$ is caused to interlock and change in a predetermined relationship in such a manner that the secondary current i$_\tau$ is held under the conditions for the constant gap flux $\Phi_g$ and also that the space current and magnetic distributions are maintained in their states attained after the distributions have changed.

As a result, the control effected by the arrangement of FIG. 2 completely fulfils the steady state conditions after the torque has been changed and the magnetic flux is scarcely changed with respect to a rotor involved. (It is noted that the magnetic flux is changed by a leakage magnetic flux of interlinkage attended upon a change in secondary current i$_\tau$).

Induction motors have the well known equivalent circuit shown in FIG. 6. In FIG. 6 the current I$_M$ flows through a primary leakage inductance l$_1$, a resistance r$_1$ of primary winding and a mutual inductance M between the primary and secondary windings to induce a secondary current i$_\tau$ across the mutual inductance M. The secondary current i$_\tau$ flows through an equivalent load resistance R$_L$, a resistance r$_2$ of the secondary winding and a secondary leakage inductance l$_2$.

A change in primary active current component is larger than that in secondary current i$_\tau$ by $\Delta$Il$_2$ and the active current component I$_\tau$ may be expressed by $$I_T = i_T + \Delta Il_2 \qquad (4)$$

In other words, the secondary current $i_T$ induced is less than the primary active current $I_T$ by $\Delta Il_2$. This means that, in the equivalent circuit of FIG. 6, a current component through the mutual inductance M is made of $(\vec{I_E} + \Delta Il_2)$ so as to increase an gap flux of interlinkage by an amount corresponding to a flux $(l_2 i_T)$ of interlinkage with the secondary leakage inductance $l_2$ due to the secondary current $i_T$ (see FIG. 4). That increment serves to compensate for a voltage drop across the secondary leakage reactance and to maintain a constant voltage $\vec{E_T}$ across the equivalent load resistance $R_L$. These respects are somewhat different from the conventional established theory that a secondary voltage $E_g$ (see FIG. 4) is controlled to be constant, alternatively, that a voltage-to-frequency ratio is controlled to be constant.

From the foregoing it will readily be understood that the three parameters or the torque $\tau$, the slip frequency $\omega_S$ and the active current component $I_T$ are linearly proportional to one another.

As a result of the immediate supply of the AC current $I_M$ having the command phase angle $\theta_T$, it is possible to induce the secondary current $i_T$ that coincides with the gap flux $\Phi_g$ or a gap flux density distribution due thereto ensuring that the torque is produced without any time delay.

In this way the linear fast responsive control can be accomplished which has the command torque $\tau$ and the command active current component $I_T$ as inputs applied thereto.

In addition, the gap flux weakening control (or the field weakening control) may be accomplished by changing the command exciting current component $I_E$ or the gap flux $\Phi_g$ or by the command excitation generator 24.

The qualitative description for the dynamic characteristics of the present invention has a limit but, it is summarized that, in order to cope with the desired change in torque, the active current component $I_T$ is generated to be orthogonal to a no-load exciting current component while the first and second function generator 28 and 30 and the command slip frequency generator 18 have been provided so that those currents fulfill both the conditions that the steady state be reached and the initial conditions.

In order to positively prove the abovementioned matters, it is required to refer to the fundamental theory of induction motors. The fundamental equations for induction motors having the shortcircuited secondary conductor may be expressed by $$\begin{pmatrix} V_{dS} \\ V_{qS} \\ 0 \\ 0 \end{pmatrix} = \begin{pmatrix} r_1 + PL_1 & -\omega L_1 & -PM & \omega M \\ \omega L_1 & r_1 + PL_1 & -\omega M & -PM \\ -PM & \omega_S M & r_2 + PL_2 & -\omega_S L_2 \\ -\omega_S M & -PM & \omega_S L_2 & r_2 + PL_2 \end{pmatrix} \begin{pmatrix} ids \\ iqs \\ idr \\ iqr \end{pmatrix} \qquad (5)$$

and $$\tau = pM(ids \cdot iqr - iqs \cdot idr) \qquad (6)$$

transformed to d and q coordinates where
Vds = voltage in d coordinate across stator
Vqs = voltage in q coordinate across stator
ids = current in d coordinate through stator
iqs = current in q coordinate through stator
idr = current in d coordinate through rotor
iqr = current in q coordinate through rotor
p = number of pole pairs
P = differential operator
$L_1$ = primary self-inductance
$L_2$ = secondary self-inductance
and $\omega$, $\omega_S$, $r_1$ and $r_2$ have been previously defined.

The preferred embodiment of the present invention as shown in FIG. 2 includes the first and second function generators 28 and 30 and the command slip frequency generator 18 operative to follow the expressions (1), (2) and (3) respectively. Generally speaking, the present invention is put under the control conditions expressed by $$ids = I_E \cos\theta_o - I_T \sin\theta_o \qquad (7a)$$

$$iqs = I_T \cos\theta_o = I_E \sin\theta_o \qquad (7b)$$

and $$\omega_S = r_2 I_T / l_2 I_E = K_2 I_T / I_E \qquad (7c)$$

respectively where $\theta_O$ designates any angle and therefore any constant meaning that reference axes for axis transformation or an initial phase angle is optional. That is, it may be selected at will. It is noted that the expression (7c) is identical to the expression (3).

Assuming that $\theta_O$ is null only for the purposes of facilitating an understanding of the theory, substituting the expressions (7a), (7b) and (7c) into the fundamental equation (5) and rearranging it can yield the following expression:

$$\begin{aligned} ids &= I_E \\ iqs &= I_T \\ iqr &= I_T M / L_2 = i_T \\ idr &= 0 \end{aligned} \qquad (8)$$

and $$\begin{pmatrix} V_{ds} \\ V_{qs} \\ 0 \\ 0 \end{pmatrix} = \begin{pmatrix} r_1 I_E - \omega L_1 (1 - M^2/L_1 L_2) I_T \\ \omega L_1 I_E + r_1 I_T + P L_1 (1 - M^2/L_1 L_2) I_T \\ 0 \\ 0 \end{pmatrix} \qquad (9)$$

Thus it is seen that the control conditions defined by the expressions (7a), (7b) and (7c) cause the secondary current to be subordinately controlled to values given by the expressions (8) while a term including the differential operator P or a transient term is cancelled out. Also it is seen that the expression (4) is nothing but to mean the expression (8).

On the other hand, the voltage equation (9) has rows on the rotor side equal to zero with the result that the shortcircuit requirements are met without the occurrence of all transient and steady-state unbalanced voltages.

Further from the voltage equation (9) it is seen that, on the stator side, the only and one transient term that includes the differential operator P is left on the q axis. However, a coefficient $(1 - M^2/L_1 L_2)$ associated with the differential operator P means a leakage coefficient $\Sigma$ and therefore $\Sigma L_1$ means a leakage inductance. Therefore $\Sigma L_1 I$ means that only a change in leakage flux of interlinkage is a factor of delaying a response.

On the other hand, the torque $\tau$ is given by $$\tau = pM^2 I_E I_\tau / L_2 \quad (10a)$$
$$= pM^2 I_E{}^2 \omega_S / r_2 = K_4 I_E{}^2 \omega_S \quad (10b)$$

and proportional to $I_\tau$ or $\omega_S$. By transforming the control requirements according to the expressions (7a) and (7b) back to the AC system having the frequency $\omega$, it is seen that phase currents are supplied to the AC system with peak values or effective values defined by the expression (1) and a phase angle of their reference-phase sequence component defined by the expression (2).

Also, the components on the d and q axes defined by the expressions (7a) and (7b) or the expressions (8) may be regarded to be current components on the imaginary and real axes of the vector diagram shown in FIG. 4 with proportional constants omitted.

From the expressions (8) through (10) it will readily be understood that, by setting the parameters as predetermined, the present invention exhibits the completely linear control characteristics as above described in conjunction with the operation of the embodiment thereof whosn in FIG. 2 which characteristics resemble the torque control characteristics exhibited by separately excited DC motors with compensating windings.

In FIG. 7 wherein like reference numerals designate the components identical or corresponding to those shown in FIG. 2, there is illustrated a modification of the present invention supplying a voltage controlled power to an induction motor involved and also adapted to optimally supply a current controlled power to the motor. In FIG. 7 the three AC parameter control circuit 26 includes, in addition to the polyphase AC waveform generator 32, a first function generator serving as a command first voltage generator 38, a second function generator serving as a command second voltage generator 40, and a differentiator 42. The command first voltage generator 38 receives both an electrical quantity corresponding to a gap flux $\Phi$, in this case, the exciting current component $I_E$ from the command excitation generator 24 and the command frequency $\omega$ from command frequency generator or the adder 16 to generate an exciting voltage $V_E$ for supplying a gap flux and, in turn, a first phase voltage component proportional to an exciting current component $I_E$. The command second voltage generator 40 is responsive to the command torque $\tau$ from the speed control circuit 22 or the command torque generator and the command frequency $\omega$ from the adder 16 to generate a second phase voltage component $V_\tau$ for supplying the active current component.

The differentiator 42 is operative to rapidly change the active current component in response to the command torque $\tau$ applied to the induction motor 10. To this end, the differentiator 42 has an input connected to the speed control circuit 22 to effect the differentiation with respect to time as will be apparent later. The differentiated exciting voltage $V_E$ is added to the exciting voltage component $V_E$ by an adder 44. The exciting voltage component $V_E$ thus compensated is applied to the polyphase AC waveform generator 32. Also the second voltage component $V_\tau$ that may be called an active voltage is applied to the waveform generator 32.

In other respects, the arrangement is substantially identical to that shown in FIG. 2 excepting that in FIG. 7, the command slip frequency generator 18 receives the command torque $\tau$ alone.

The operation of the three AC parameter control circuit 26 shown in FIG. 7 will now be described with reference to a vector diagram illustrated in FIG. 8. Command values of the gap flux $\Phi$, the exciting current component $I_E$ therefor, the active current component $I_\tau$ contributing to the torque $\tau$ provided by the induction motor 10, the secondary voltage $E_g$ for the gap flux $\Phi$ in the motor 10 and the frequency $\omega$ can be produced in the similar manner as above described in conjunction with FIG. 2 wherein the current control type is illustrated.

Figures 8, 9:
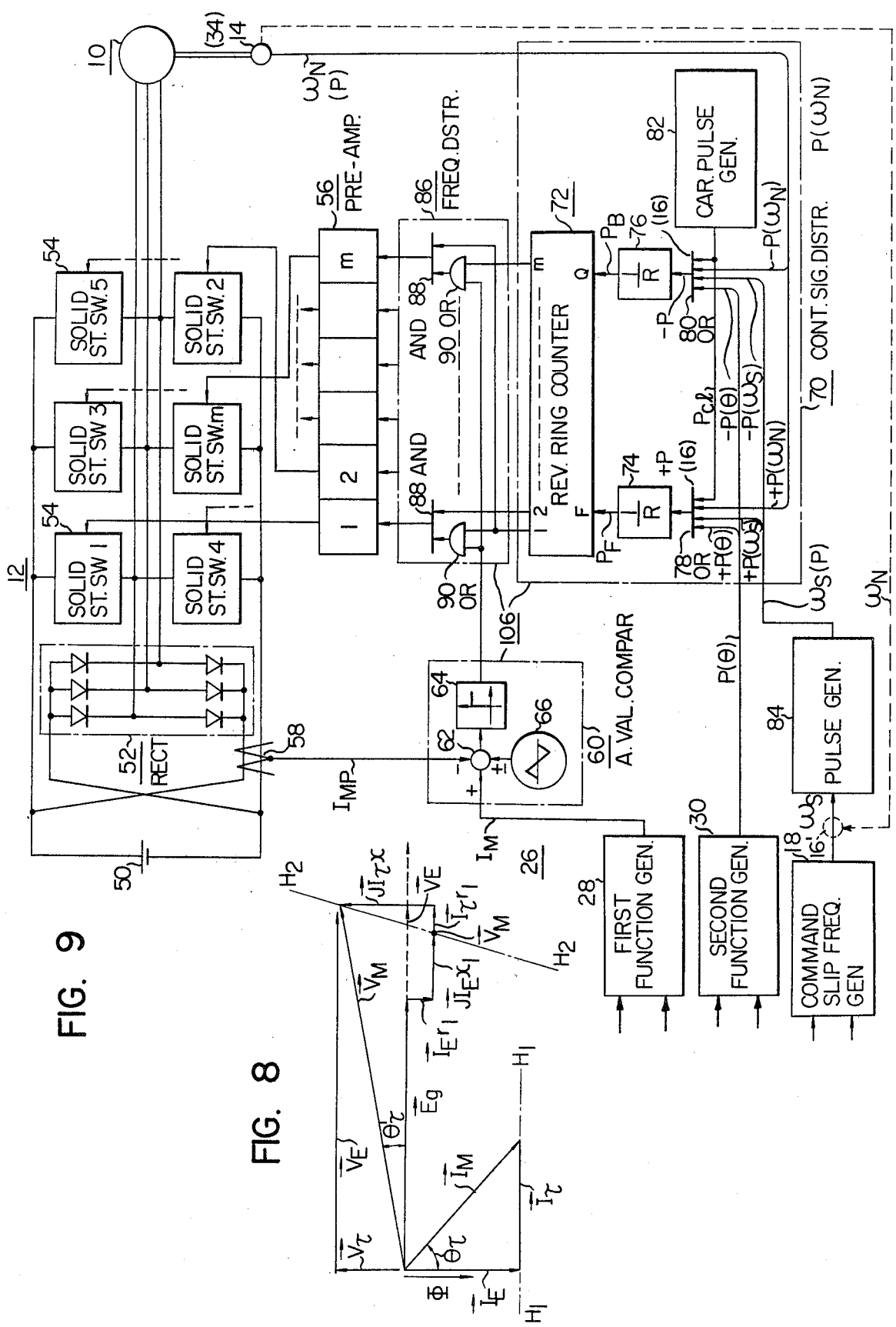
FIG. 8 is a vector diagram useful in explaining the operation of the arrangement shown in FIG. 7.
FIG. 9 is a circuit diagram of the details of one portion of the arrangement shown in FIG. 2.

In FIG. 8 the exciting current component $I_E$ applied to the induction motor 10 produces a voltage $(\vec{I_E}r_1 + j\vec{I_E}x_1)$ across a primary leakage impedance $(r_1 + jx_1)$ thereof where $x_1$ designates a primary leakage reactance and j designates the unit of imaginary numbers. That voltage is added to the secondary voltage $\vec{E_g}$ to form a no-load motor voltage $\vec{V_{MO}}$. By making the extremity of the no-load motor voltage $\vec{V_{MO}}$ the center of the operation, a voltage $\vec{V_M}$ supplied across the motor is controlled along a straight line $H_2$-$H_2$ passing through the center of the operation. The voltage $\vec{V_M}$ supplied across the motor under loading is the vector sum of the no-load motor voltage $\vec{V_{MO}}$ and a voltage drop $(I_\tau r_1 + j\vec{I_\tau}z)$ across a motor impedance $(r_1 + jx)$ due to a load current component $I_\tau$. When the on-load motor voltage $\vec{V_M}$ has its extremity lying on that portion of the straight line $H_2$-$H_2$ extending in an upward direction as viewed in FIG. 8 from the center of the operation, the motor is operated in the motoring mode. On the other hand, when the motor voltage $\vec{V_M}$ is tilted downwardly to the secondary voltage $\vec{E_g}$, the motor is put in the regenerated mode of operation.

From the foregoing it is seen that the on-load motor voltage $\vec{V_M}$ has a second phase voltage leading component $\vec{V_\tau}$ and a first phase voltage component $\vec{V_E}$ given by the following expressions:

$$V_E = E_g + I_E x_1 + I_\tau r_1 \quad (11)$$

and $$V_\tau = -I_E r_1 + I_\tau x \quad (12)$$

Alternatively $$V_M = \sqrt{V_E{}^2 + V_\tau{}^2} \quad (13)$$
and
$$\theta_\tau' = \tan^{-1} V_\tau / V_E$$

hold where $V_M$ designates the absolute value of the on-load motor voltage $\vec{V_M}$ and $\theta_\tau'$ designates a phase angle formed between the voltages $\vec{V_M}$ and $\vec{V_E}$.

On the other hand, the command slip frequency $\omega_S$ is defined by the expression (3) or (10b). Since the voltage concerning the magnetic flux is proportional to the frequency $\omega$, these proportional multiplication inputs are applied to the function generators (38) and (40).

Also, as the expressions (13) has the equivalent interchangeability with the expressions (11) and (12) in the arrangement of FIG. 7, the three AC parameter control circuit (26) shown in FIG. 7 may be modified to that shown in FIG. 2. In the latter case, the function generators 28 and 30 may be additionally provided with respective multiplication elements to effect the multiplication by the frequency $\omega$.

On the other hand, the expressions (11) and (12) correspond to the equation for a stator voltage described by the expression (9). Therefore $V_E = V_{qs}$ and $V_\tau = -V_{ds}$ hold. In the steady-state operation it may be regarded that $$\omega L_1 I_E = E_g + I_E x_1 \quad (14)$$

and $$\omega L_1 (1 - M^2/L_1 L_2) = x$$

hold. However, since $V_{qs}$ appearing the expression (9) includes a term including the differential operator, the differentiator and compensation adder 42 and 44 respectively are operated to add a differentiated compensation voltage $\dot{V}_E$ to the command exciting voltage component $V_E$ in response to a change in torque or command torque $\tau$. Thereby the required component $I_\tau$ has an improved fast response to a rapid change in torque.

From the expressions (9), (10a) and (10b) it is seen that this differentiated compensating voltage $\dot{V}_E$ of the first phase voltage component $\dot{V}_E$ may be defined by $$\begin{aligned}\dot{V}_E &= (1 - M^2/L_1 L_2) dI_\tau/dt \quad (15)\\ &= K_5'(dI_\tau/dt)\\ &= (L_2/pM^2 I_E)(1 - M^2/L_1 L_2) d_\tau/dt\\ &= K_5(d_\tau/dt)\end{aligned}$$

where $K_5'$ and $K_5$ are constants. In other words, one obtains $$\int \dot{V}_E dt = (1 - M^2/L_1 L_2) I = \phi l(I_\tau) \quad (16)$$

Therefore, by adding a voltage $\dot{V}_E$ having the product of voltage and time to the first phase voltage component $V_E$ one may obtain leakage flux of interlinkage $\Phi l(I_\tau)$ due to the active current $I_\tau$.

From the foregoing it will be appreciated that the present invention as described in conjunction with FIG. 7 may be extended to be applicable to voltage controlled power supply devices wherein fast response characteristics are required.

FIG. 9 shows the details of the power supply device 12 and the three AC parameter control circuit 26 as shown in FIG. 2. In FIG. 9 the power supply device 12 includes a DC source 50 and a rectifier group 52 including m/2 (where m is any even integer, in this case m, having a value of six) pairs of serially connected semiconductor diodes connected in parallel circuit relationship across the source 50 so that their anode and cathode electrodes are connected to the negative and positive sides of the source 50 respectively. Also m/2 pairs of serially connected solid state switches 54 connected in parallel circuit relationship across the source 50. The solid state switch 54 may be any of a transistor, thyristors and other semiconductor elements. The switches 52 include respective control electrodes (not shown) controlled by a group of preamplifiers 56 which may be gate pulse or base current limiting amplifiers. The junction of diodes in each pair is connected to that of the solid state switches 54 in the corresponding pair and thence to the induction motor 10. Thus the rectifier group 52 and the solid state switch group 54 form an inverter bridge including m/2 AC output terminals. In the example illustrated m is of six as above described and the three switches labelled ordinal odd number 1, 3 and 5 are connected at their anode electrodes to the positive side of the source 50 and at the cathode electrodes to the switch Nos. 4, m and 2 respectively. The latter switches have the cathode electrodes connected to the negative side of the source 50.

The power supply device 12 further includes a current sensor 58 such as a current transformer coupled to both a lead connecting the negative side of the source 50 to the cathode electrodes of the lower solid state switches as viewed in FIG. 9 and a lead connecting the positive side of the source 50 to the cathode electrodes of the lower rectifier elements as viewed in the same Figure. The current sensor 58 senses the sum of a current flowing through the rectifier group and that flowing through the switch group. This measure results in a simplified circuit configuration.

The three AC parameter control circuit 26 is arranged to effect the phase and frequency control with digital pulse trains. The command fed current $I_M$ from the first function generator 28 is applied to an absolute-value comparator 60 forming one part of the polyphase AC waveform generator 32. In the comparator 60, the command fed current $I_M$ is applied to a summing point 62 to subtract a current $I_{MP}$ sensed by the current sensor 58 therefrom and a difference therebetween is supplied to a comparing element 64 to form a chopping signal S(cH). Further a carrier generator 66 generates a triangular or a saw-toothed wave which is, in turn, applied to the comparing element 64 through the summing point 62 to be suporposed on the chopping signal S(cH) thereby to impart a predetermined carrier period to the signal. Thus the chopping control that is the ON-OFF time ratio control or pulse width modulation control is effected.

If desired, the sensed current $I_{MP}$ may be formed by separately rectifying respective phase currents supplied to the induction motor 10.

The command phase angle $\theta_{96}$ from the second function generator 30 is applied to a conduction control-signal distributor 70. The control signal distributor 70 includes an m-mal reversible ring counter 72 having outputs 1,2,..., m and a pair of forward and backward inputs F and B, two frequency dividers 74 and 76 connected to the inputs F and B of the counter 72 respectively, two "OR" gates 78 and 80 connected to the frequency dividers 74 and 76 respectively and a carrier pulse generator 82 connected to one input of each "OR" gate 74 or 76. Each of the "OR" gates 74 or 76 includes the remaining three inputs connected to the speed sensor 14, a pulse generator 84 and the second function generator 30 respectively.

The speed sensor 14 in this case is, for example, an incremental rotary encoder for generating a train of rotating frequency adding pulses $P(\omega_N)$ having a pulse repetion frequency $\omega_N(P)$ indicating the actual frequency $\omega_N$ of the induction motor 10. The pulse generator 84 is connected to the command slip frequency generator 18 to generate a train of slip frequency control pulses $P(\omega_S)$ having a pulse petition frequency $\omega_S(P)$ in response to the command slip frequency $\omega_S$. The second function generator 30 generates a train of phase control pulses $P(\theta)$ representative of the command fed phase angle $\theta_{96}$ and the carrier pulse generator 82 generates a train of carrier pulses $P_{cl}$ having a pulse repetition frequency $\omega_{Pcl}$. Each of the pulses $P(\omega_N)$, $P(\omega_S)$, $P(\theta)$ and $P_{cl}$ has either a positive or negative value and the position pulses are applied to the "OR" gate 78 while the negative pulses are applied to "OR" gate 80.

The ring counter 72 cooperates with the frequency dividers 74, 76, the "OR" gates 78, 80 and the carrier pulse generator 82 to perform both the function of controlling a phase angle and the function of composing frequencies.

Only for purposes of illustration, the pulses appearing from the "OR" gates 78 and 80 are designates by +P and −P respectively and the pulses delivered from the frequency dividers 74 and 76 are designated by $P_F$ and $P_B$ respectively. Also the pulses $P_F$ and $P_B$ are called forward and backward shift pulses respectively. The forward and backward shift pulses are also known as a clockwise and a counterclockwise rotation pulse designated by CW and CC respectively or as a count-up and a count-down pulse respectively.

Each pulse train is frequency divided by a factor of R through either of the frequency dividers 74 and 76 and further by a factor of m through the ring counyer 72. For example, the pulse train $P(\omega_N)$ is frequency divided by a factor of m.R to have a pulse repetition frequency $\omega_N = \omega_N(P)/m.R$.

The pulses $P(\omega_N)$, $P(\theta)$ and $P(\omega_S)$ entering the "OR" gate 78 are operative to cause the fed phase angle to move forward by an electrical angle of $\overset{*}{\theta} = 2\pi/m.R$ radian that is one control unit per each pulse. That is, the phase angle is caused to rotate stepwise in a positive direction by that angle to lead. On the contrary, these pulses entering the "OR" gate 80 are operative to cause the fed phase angle to move backward by an electrical angle of $\overset{*}{\theta} = 2\pi/m.R$ radian per each pulse. That is, the phase angle is caused to rotate stepwise in a negative direction to lag. On the other hand, the carrier pulses $P_{cl}$ can not step the fed phase but determine pulse repetition frequencies of the forward and backward shift pulse $P_F$ and $P_F$ in the abscence of all the other pulses applied to the both "OR" gates 78 and 80. In other words, the pulses $P_{cl}$ determine a pulse phase modulation carrier frequency $\omega_c$ expressed by $\omega_c = \omega_{Pcl}/R$. In the absence of the pulses $P(\omega_N)$, $P(\theta)$, and $P(\omega_S)$ applied to the two "OR" gates 78 and 80, the forward shift pulses $P_F$ are equal in pulse repetition frequency to the backward shift pulses $P_B$.

Each time any one of the phase control pulses $P(\theta)$ or $+P(\theta)$ and $-P(\theta)$, the slip frequency control pulses $P(\omega_S)$ or $+P(\omega_S)$ and $-P(\omega_S)$ and the rotating frequency adding pulses $P(\omega_N)$ or $+P(\omega_N)$ and $-P(\omega_N)$ is applied to the associated "OR" gate 78 or 80, a relative phase difference is caused between the corresponding forward and backward shift pulses $P_F$ and $P_B$ respectively and determines a ratio of a conduction time or of a pulse width between each solid state switch and the adjacent one while the mean value thereof determines the effective fed phase angle or an angle of rotation of vector. The term "angle of rotation of a vector" means an angle of rotation of an magnetic axis caused in a gap in an induction motor involved by a current or voltage supplied to the motor in the particular power supply state. Thus the fed phase angle means that angle of rotation of the vector.

Further the pulses $P(\omega)$, $P(\omega_S)$ and $P(\omega_N)$ applied to the "OR" gates 78 and 80 have an algebraically time-integrated value that determines an added angle of rotation of the vector integrated with respect to time while the algebraic sum of their frequencies determines a frequency difference $(\omega_{PF} - \omega_{PB})$ between the frequency $\omega_{PF}$ of the forward shifted pulse $P_F$ and that $\omega_{PB}$ of the backward shift pulse $P_B$ and, in turn, the supplied frequency $\omega$. That is, $$\omega = (\omega_{PF} - \omega_{PB})/m = [\omega_S(P) + \omega_N(P)]/m.R$$

holds. Further the phase control pulses $P(\theta)$ have an added number of pulses $N_P(\theta)$ that determines a shifted value $\theta_T$a fed phase angle $\theta_{96}$ or shifted value of a phase angle. That is, $$\theta_T = \overset{*}{\theta} N_P(\theta) = 2\pi N_P(\theta)/m.R$$

holds.

The details of the power supply control utilizing the forward and backward pulses as above described may be found in U.S. Pat. Nos. 3,992,657 and 4,002,958. The pertinent portion of both patents is incorporated herein for reference.

In this way, the function of adding the command rotating frequency $\omega_N$ to the command slip frequency $\omega_S$ and the function of controlling the command fed phase angle $\theta_T$ have been performed with the digital pulse trains.

The results of the processes as above described are supplied to a frequency distributory 86 for determining an output frequency modulated with the carrier caused from the carrier pulse generator 82. The frequency distributor 86 forms the other part of the AC waveform generator 32 and includes a plurality of "AND" elements 88 one for each output of the ring counter 72. Each "AND" element 88 has one input applied with the chopping signal S(cH) from the absolute value comparator 60, the other input connected to a corresponding one of the outputs 1, 2, . . . , m of the ring counter 72, and an output connected to one input of an associated "OR" element 90. Each "OR" element 90 has the other input connected to that output of the ring counter 72 adjacent to the output thereof in a direction that the ordinal numbers identifying the outputs of the ring counter 72 increase in value.

For example, the "OR" element connected to the output 1 of the ring counter 72 through the mating "AND" element 88, has the other input connected to the output 2 of the ring counter 72. The "AND" element 88 connected to the last output m of the ring counter 72 is connected to the "OR" element 90 having the other input connected to the first output 1 of the ring counter 72.

Then each "OR" element 90 is connected at the output to that preamplifier 56 identified by the same ordinal number as that designating the output of the ring counter 72 connected to the mating "AND" element 88. As above described, the preamplifiers 72 are connected to the solid state switches 54 respectively so that the ordinal numbers identifying the preamplifiers 56 is equal to those identifying the solid state switches 54 respectively.

The outputs of the distributor 86 or the "OR" elements 90 deliver output signals from the outputs 1, 2, . . . , m of the ring counter 72 to the preamplifiers 56 in a predetermined order. The output signals from the preamplifiers 56 circulate along the outputs of the preamplifiers 56 at the supplied frequency $\omega$ on the average while their frequency rises and falls from the pulse phase moduration carrier frequency $\omega_c$.

When the chopping signal S(cH) is an "ON" signal, the two or three solid state switches 54 is conducted in a predetermined order to permit the source 50 to supply an electric power to the induction motor 10 through the conducting switches 54. When the chopping signal S(cH) is an "OFF" signal, one or two of the conducting switches is or are turned off to suspend the power supply to the induction motor 10. The chopping mode of operation as above described is repeated to control the absolute value of the fed current $I_M$.

From the foregoing it is seen that the control of the three AC parameters or the absolute value of the current $I_M$, the supplied phase angle $\theta_T$ and the slip frequency $\omega_S$ ( and the output frequency $\omega$) is accomplished by the embodiment of the present invention as shown in FIG. 7 including both the simplest digital electronic circuitry and the simple main circuit.

FIG. 9 also illustrates positional control means as shown at dotted line in FIG. 2 at dotted line extending from the speed sensor 12 serving as the positional sensor 34 to a dotted circle located between the command slip frequency generator 18 and the pulse generator 84.

In this case the sensor 34 produces the pulse repetion frequency $\omega_N$ of the frequency adding pulses.

Figure 10A:
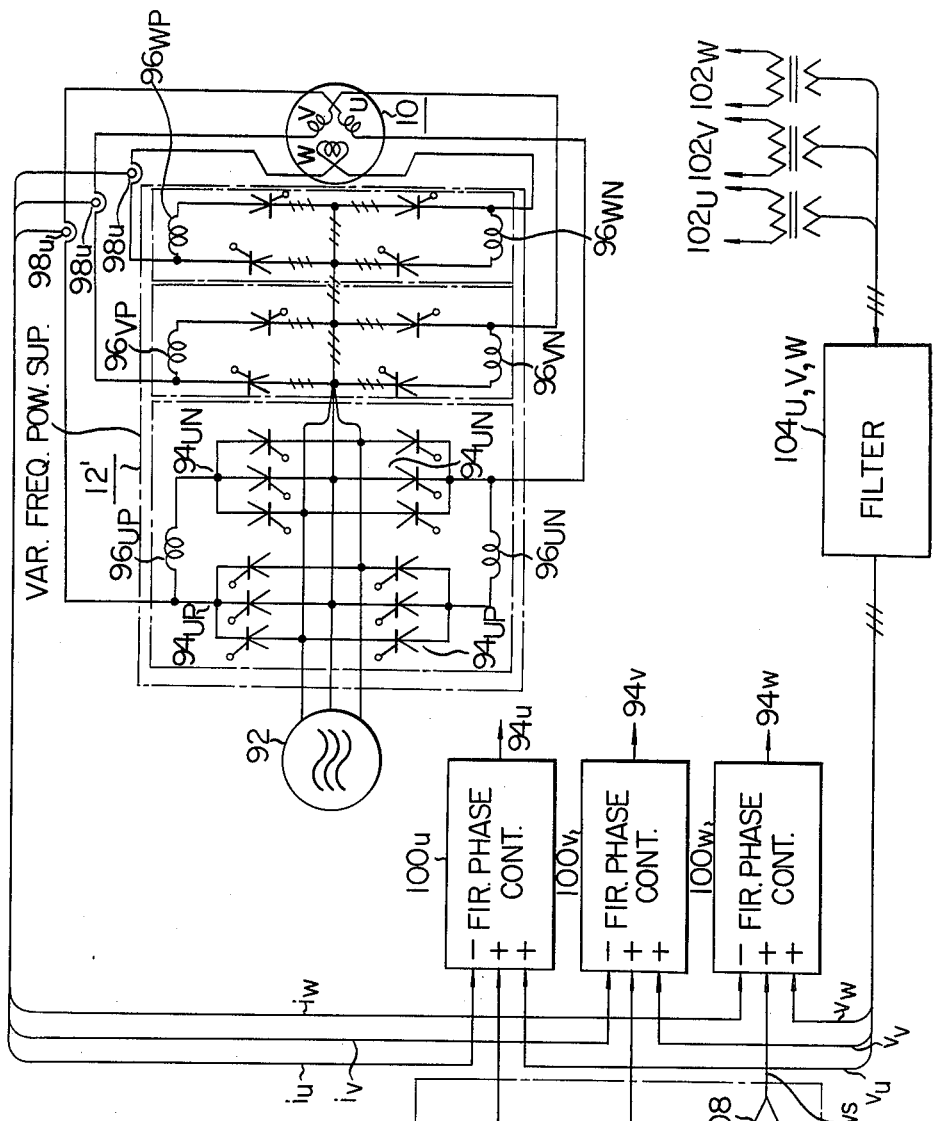
FIG. 10a is a circuit diagram of another modification of the present invention.

FIG. 10a shows another modification of the present invention wherein a three-phase induction motor is controlled in the current control mode of operation. A three-phase AC generator 92 supplies a current controlled power to the three-phase induction motor 10 through current controlled power supply device 12' that may be an inverter or a cyclo-converter. In the example illustrated the power supply device 12' forms a cyclo-converter for supplying a three-phase current to the motor 10. The power supply device 12' comprises three-rectifier circuits 94u, 94v and 94w one for each phase. The rectifier circuit 94u is shown in FIG. 10a as including a first set of three series combinations of two similarly poled semiconductor rectifiers 94uP such as thyristors interconnected in parallel circuit relationship and a second set of three similar series combinations of two similar rectifiers 94uN connected in anti-parallel circuit relationship with the first set of the three series combination. Then a rector 96uP connects cathode electrodes of the rectifiers 94uP to anode electrodes of the rectifiers 94uN on the uppers side as viewed in FIG. 10a and a rector 96uN connects cathode electrodes of the rectifiers 94uP to anode electrodes of the rectifiers 94uP on the lower side. The junctions of the serially connected rectifiers 94uP or 94uN in each set are connected to the similar junctions in the other set and also AC outputs of the three-phase generator 92.

Each of the remaining rectifier circuits 94v and 94w is identical to the rectifier circuit 94u and schematically shown by two pairs of two serially connected rectifiers connected in anti-parallel circuit relationship with each other through two reaction 96vP and 96uN or 96wP and 96wN.

The rectifier circuits 94u, 94v and 94w include individual pairs of DC outputs connected across three primary windings u, v and w of the open-delta connection of the induction motor 10 respectively. Three current sensors 98u, 98v and 98w such as current transformers are coupled to leads connecting the primary windings u, v and w to the rectifier circuits 94u, 94v and 94w respectively and also connected to one input of three rectifier firing phase controls 100u, 100v and 100w respectively to apply the sensed currents $i_u$, $i_v$ and $i_w$ with negative polarity to the latter respectively. Then the firing phase controls 100u, 100v and 100w are connected to the rectifier circuits 94u, 94v and 94w respectively as shown at the arrows whereby a closed loop control circuit is prepared for the induction motor 10.

As shown on the lower portion of FIG. 10a, the induction motor 10 includes voltage sensors 102u, 102v and 102w which are, in turn, connected to respective filters symbollically shown by block 104u·v·w. Those voltage sensors may be search coils buried in the induction motor 10. The filters 104u·v·w supply the sensed, filtered voltages $V_u$, $V_v$ and $V_w$ to second inputs of the firing phase controls 100u, 100v and 100w with the positive polarity respectively for comparison purposes. The positive feedback of the motor voltages $V_u$, $V_v$ and $V_w$ is very effective for reducing or substantially eliminating deviations of the absolute motor voltage values and phases angle thereof from the command value thereof.

In order to provide command waveforms with which instantaneous waveforms of the sensed phase currents are compared, the firing phase controls 100u, 100v and 100w are connected at the third inputs to a command waveform generator 32. That generator 32 forms the center of the three AC parameter control circuit 26 as above described and, in this case, utilizes the conduction control signal distributor 70 as shown in FIG. 9.

If desired, the command waveform generator 32 may employ any of various analog and digital means and also may utilize any of various digital-to-analog converters.

In FIG. 10a, the conduction control signal distributor 32 receives the command phase angle $\theta_T$, the command slip frequency $\omega_S$ or $\omega_S(P)$ and the command rotating frequency $\omega_N$ or $\omega_N(P)$ (see also FIG. 9) and selectively provides at its outputs 1, 2, ..., m (where m is any even integer and in this case m has a value of six) ON-OFF signals pulse-width modulated with the forward and back shift pulses $P_F$ and $P_B$ respectively as above described in conjunction with FIG. 9. In the example illustrated, the ON-OFF signals have pulse widths equal to phase differences between the pulses $P_F$ and $P_B$.

Then the ON-OFF signals thus produced are applied to a plurality of multipliers 106 one for each of the m outputs of the signal distributor 70. The command supplied current $I_M$ is applied to the multipliers 106 and switching-modulated with the ON-OFF signals to provide an AC half-wave pattern at outputs of the multipliers 106. The switching-modulation is one sort of the multiplication.

Figure 10B:
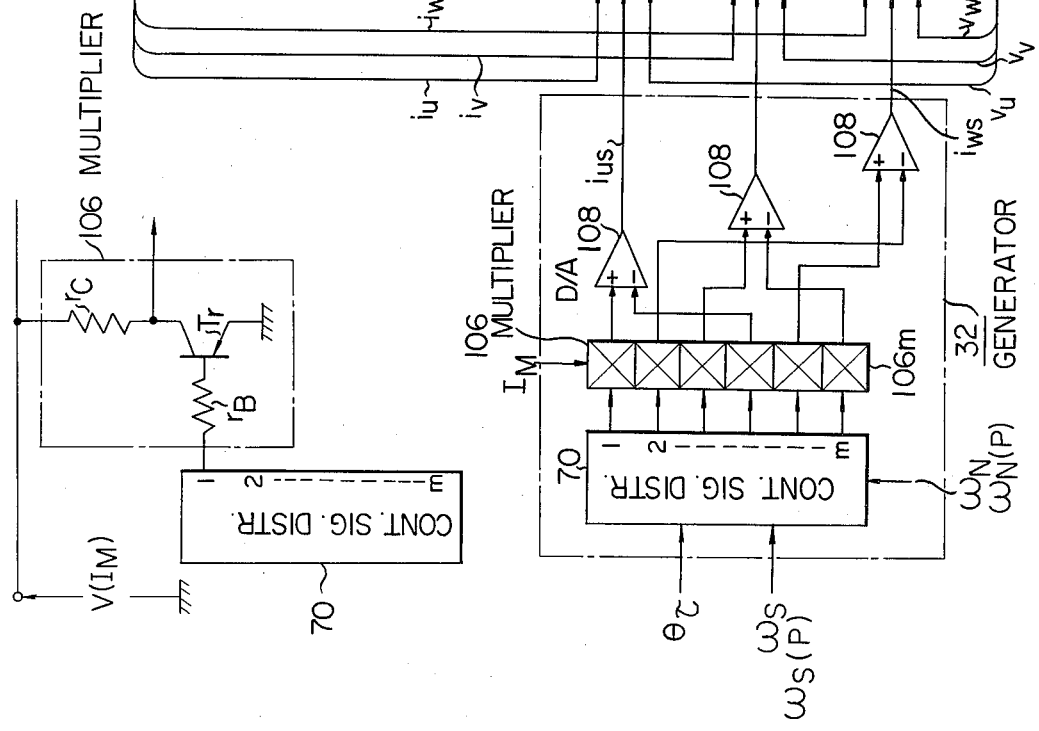

FIG. 10b shows an analog switch suitable for use as the multiplier 106. As shown, the multiplier 106 includes a common emitter NPN type transistor $T_r$ having a base connected to a corresponding output, in this case, the output 1 of the signal distributor 70 through a base resistor $r_B$ and a collector connected to a collector resistor $r_c$. A voltage V corresponding to the supplied current $I_M$ is applied between the collector resistor $r_c$ and the emitter of the transistor $T_r$ while an output is delivered from the collector thereof.

The outputs of the m multipliers 106 where m=6 are connected to m/2 analog adders 108 so that every two outputs thereof are connected to a positive and a negative input of each adder 108 assuming that the last output is adjacent to the first output. Thus each adders 108 composes the two associated outputs from the multipliers 108 into a command AC waveform $i_{uS}$, $i_{vS}$ or $i_{wS}$ for each phase which is subsequently supplied to the associated firing phase controls 100u, 100v and 100w. In each phase control 100u, 100v or 100w, the command AC waveform $i_{uS}$, $i_{vS}$ or $i_{wS}$ is compared with the sensed phase current $i_u$, $i_v$ or $i_w$ respectively, and a difference current therebetween is applied to the associated rectifier circuit 94u, 94v or 94w to control the firing phase of the rectifiers disposed therein.

Ripple components developed in the pulse width modulation as above described decay or may decay by both the adders 108u, 108v and 108w and the firing phase controls 100u, 100v and 100w also acting as current limiters.

From the foregoing it is seen that the control of the supplied phase angle $\theta_T$ and the composition of the slip frequency $\omega_S$ and the rotating frequency $\omega_N$ can be accomplished in the similar manner as above described in conjunction with FIG. 9 and that the absolute current value can be controlled with the command supplied current $I_M$ applied to the multipliers 108.

The reactors 96uP through 96wP and 96uN through 96wN disposed in the power supply circuit 12 can supress ripple components due to the rectification and current components circulating through the rectifier circuits without the occurrence of AC voltage drops across impedances involved.

Although the waveform generator 32 may generate a sinusoidal wave, a sinusoidal wave approximated by broken lines or a trapezoid wave, the same employing the signal distributor 70 including the reversible ring counter 72 (see FIG. 9) generates a trapezoid waveform. This cooperates with the reactors included in the rectifier circuits to permit three phase currents in the form of trapezoids to be supplied to the induction motor 10. Further, if the inductance of coupling reactors is selected to a low magnitude, then the induction motor may be applied with a three-phase current with sinusoidal waveform in place of the trapezoidal waveform.

In still another modification of the present invention illustrated in FIG. 11 wherein like reference numerals designate the components identical or similar to those shown in FIG. 2 or 7 and FIGS. 9 and 10, the power supply circuit 12' is identical to that shown in FIG. 9 and acts as a pulse width modulation inverter to supply a voltage waveform controlled power to three-phase induction motor 10 as will be described hereinafter. Voltage sensor means 102 are operatively coupled to the induction motor 10. The voltage sensor may be a voltage transformer or a search coil buried in the motor 10. Three phase motor voltages are sensed by the voltage sensor means 102 and after having been filtered or smoothed by filter means 104, applied to voltage controls 100. The absolute value comparator 60 as shown in FIG. 9 may be substituted for the voltage control 100. The filter 104 may be an integrator or a simple delay circuit with the first order or any of delay circuits with higher orders.

If desired, the voltage control 100 may be replaced by a voltage parity-converted-to-magnetic flux control that controls a voltage waveform having a voltage value proportional to a frequency by controlling a voltage integrated with respect to time. In the latter case, the filter means 104 are required only to act as an integrator.

The three AC parameter control circuit 26 in this case may comprise a reference voltage or a reference flux waveform generator because of the voltage or interlinkage flux waveform control type.

The three AC parameter control circuit 26 comprises proportional coefficient elements 110 and 112 having applied thereto a command torque $\tau$ formed in the same manner as above described in conjunction with FIG. 2 to form constants concernings 1 and $r_l$ respectively. A multiplier 114 is supplied with an output $\Phi1$ (see the expression (16)) from the proportional coefficient element 110. Also the command frequency $\omega$ as above described is applied to the multiplier 114 to cause the latter to deliver a voltage $I_{Tx}$ appearing in the expression (12) which voltage is applied to an adder 116. Then the gap flux $\Phi$ as above described in conjunction with FIG. 2 is applied to a proportional coefficient (r/m) element 118 connected to the adder 116. In the adder 116, the output from the multiplier 114 is added to an output with the genative polarity from the proportional coefficient (r/M) element 118 to produce the command active voltage V defined by the expression (12).

In order to produce the first phase voltage component $V_E$ as defined by the expression (11), the proportional coefficient element (r/M) 112 is connected to another adder 120 that is connected to another multiplier 122 having applied thereto both the gap flux $\Phi$ and the command frequency $\omega$. As a result, the adder 122 provides the voltage component $V_E$ (see the expression (11)).

From the foregoing it is seen that the components 110 through 122 form function generators to generate two AC components in quadrature relationship having respective amplitudes $V_T$ and $V_E$ in the voltage control mode or $\Phi$ and $\Phi_E$ in the interlinkage flux mode of operation. That is, the two AC components thus generated are expressed by the d and q coordinate system.

Since the multipliers 114 and 122 effect the multiplication by the frequency $\omega$ in the voltage waveform control mode of operation, they may be omitted in the flux waveform control mode of operation performed after the conversion to magnetic flux, that is to say, when the components 102 and 104 function as an integrator and a gap flux sensor respectively.

The three AC parameter control circuit 26 further comprises a reference waveform generator 106 that may be identical to the generator 106 shown in FIG. 10a. In FIG. 11, however, the waveform generator 106 has a circuit configuration as best shown in FIG. 12. As shown, the waveform generator 106 comprises an analog-to-frequency converter 124 applied with a command frequency $\omega$ formed through the addition of analog signals $\omega_S$ and $\omega_N$ as above described in conjunction with FIG. 7. The converter 124 delivers phase shifted pulses $P(\theta)$ having a pulse repetition frequency proportional to the command frequency $\omega$ to a reversible ring counter 72. That counter 72 is similar to the counter 72 as shown in FIG. 9 but has the number of counter stages equal to twice that of the latter. In other words, the counter 72 is shown in FIG. 12 as including six output terminals 1a, 2a, 3a, 4a, 5a and 6a alternating six output terminals 6b, 1b, 2b, 3b, 4b and 5b. Outputs at the output terminals 1a through 6a are put in quadrature relationship with those at the output terminals 1b through 6b respectively.

Then the output terminals 1a through 6a of the ring counter 72 are connected to a plurality of multipliers 124a one for each output terminal while the remaining output terminals 1b through 6b thereof are similarly connected to multipliers 124b. The AC component $V_T$ or $\Phi_T$ as above described is supplied to all the multipliers 106a and the other AC component $V_E$ or $\Phi_E$ is supplied to all the multipliers 106b.

Then the six multipliers 106a are connected to three adders 108a (only one of which is shown) in the same manner as above described in conjunction with FIG. 10a and the six multipliers 106b are similarly connected to three adders 126c (only one of which is shown). Those adders 108b and 108c coupled to each pair of the counters outputs labelled the identical reference numerals with the suffixes a and b are connected at the outputs to an output adder 108 for each phase, for example, the adders 108b and 108c coupled to the counter's output 1a and 1b are connected to the output adder 108.

Each set of the counter portion including the output terminals 1a, ..., 6a or 1b, ..., 6b and the associated components 108a and 110a or 108b and 110b is operated in the same manner as above described in conjunction with the waveform generator 106 shown in FIG. 10a to generate a waveform put in quadrature relationship with another waveform generated by the other set thereof.

The waveform developed from the adders 108a represents a command second phase voltage component having an amplitude as determined by the input $V_\tau$ applied to the multipliers 106a and the waveform from the adders 108b represents a command first phase voltage component having an amplitude as determined by the input $V_E$ applied to the multipliers 106b. Both waveforms are added to each other by the adder 108 for each phase resulting in a command resultant voltage or a command voltage-converted-to-flux waveform $V_{uS}$, $V_{vS}$ or $V_{wS}$. Those resultant voltages or flux waveforms are supplied to the associated voltage controls 100 to be compared with the sensed motor voltages respectively.

The voltage or firing phase controls 100 supply differences between the command and sensed voltages to the associated pairs of solid state switches to control their firing angles thereby to supply a three-phase voltage controlled power to the induction motor 10.

Figure 11:
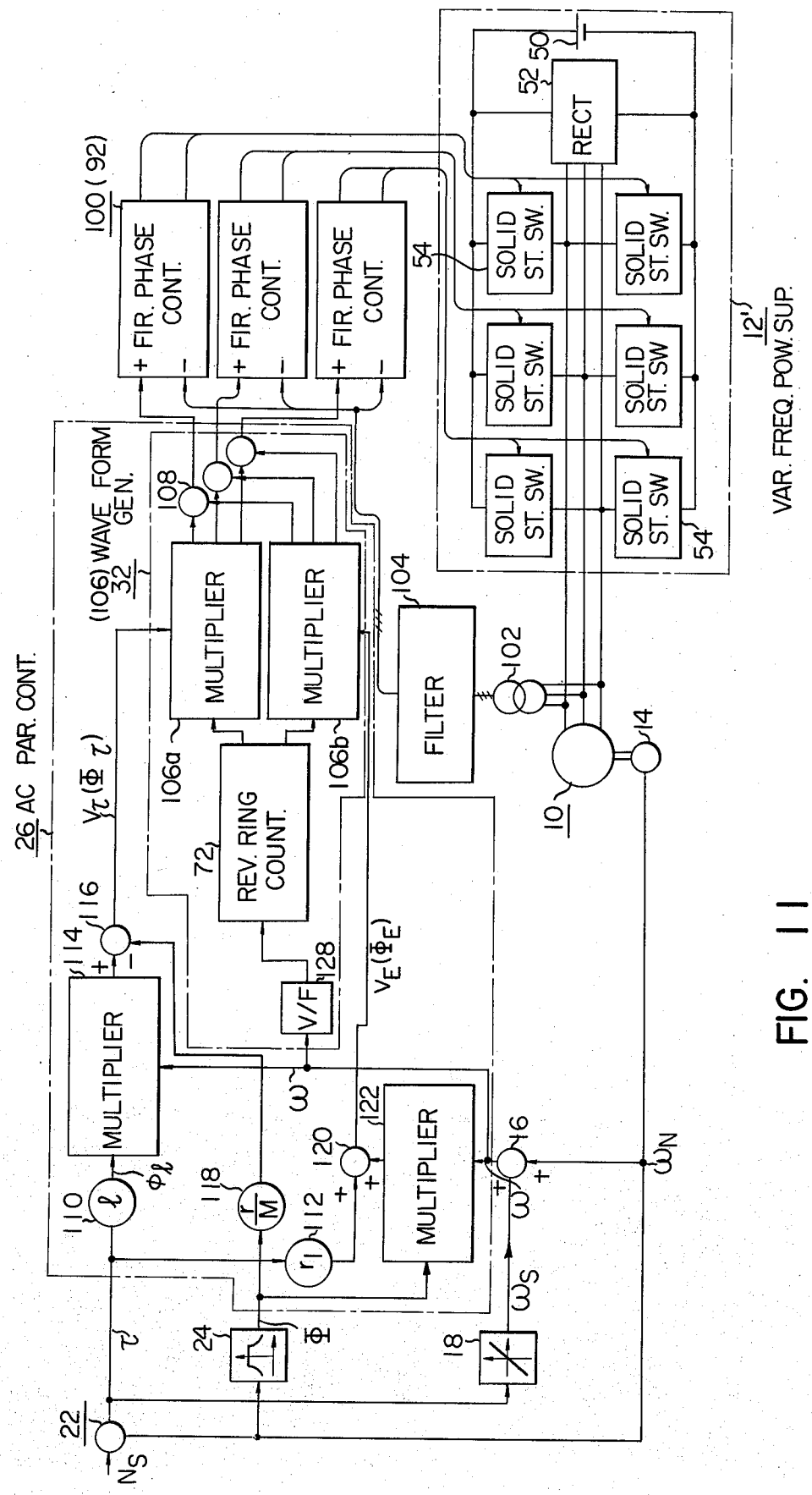
FIG. 11 is a block diagram of still another modification of the present invention.
Figure 12:
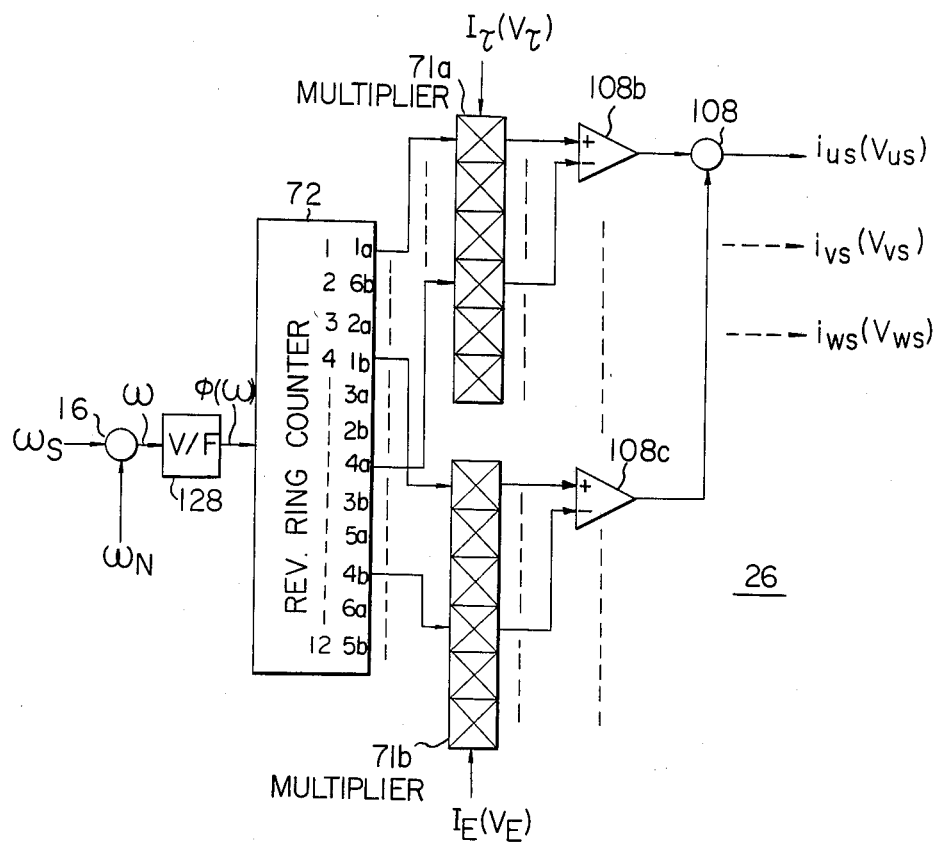
FIG. 12 is a block diagram of the AC waveform generator shown in FIG. 11.

From the foregoing it will be appreciated that the arrangement as shown in FIGS. 11 and 12 perform the voltage controlled power supply as above described in conjunction with FIG. 7.

As above described, the converted flux control system includes the three AC parameter control circuit 26 having no multipliers 114 and 122 shown in FIG. 11. If the magnetic fluxes $\Phi_T$ and $\Phi_E$ are replaced by the currents $I_T$ and $I_E$ respectively, then the AC parameter control circuit 26 without the multipliers 114 and 122 may be suitable for use with current controlled power supply systems.

Figure 13:
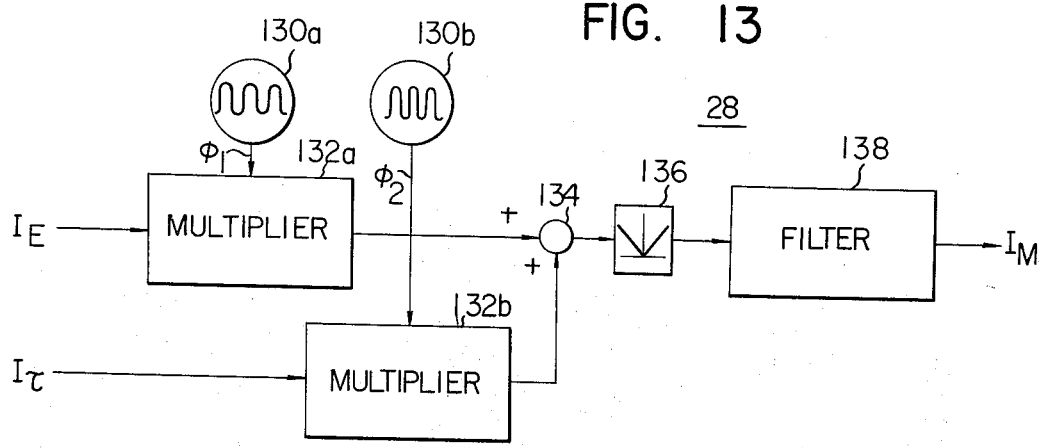
FIG. 13 is a block diagram of the first function generator shown in FIGS. 2 and 9.
Figure 14:
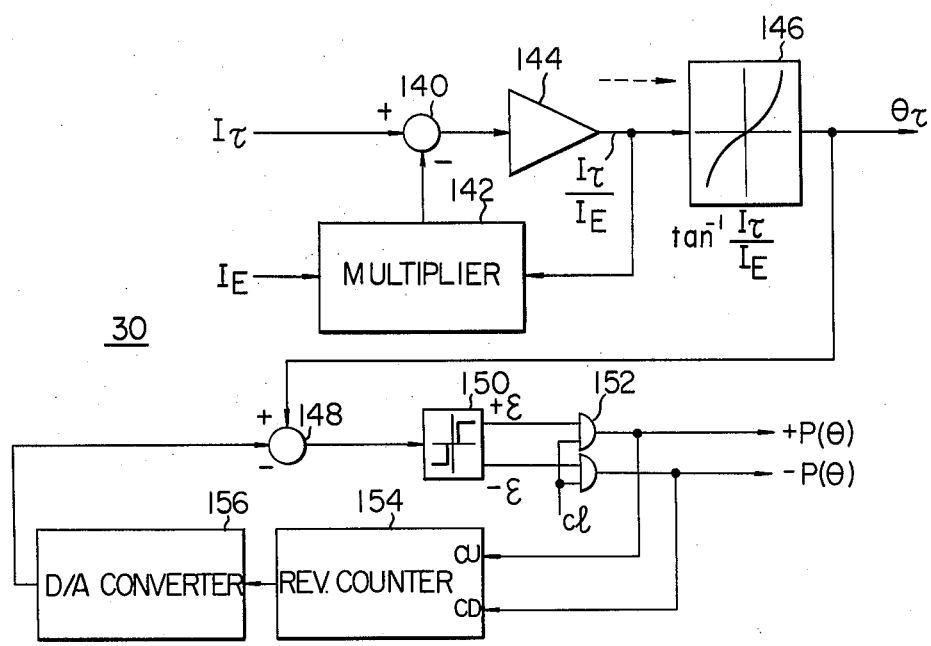
FIG. 14 is a diagram similar to FIG. 13 but illustrating the second function generator shown in FIGS. 2 and 9.
Figure 15:
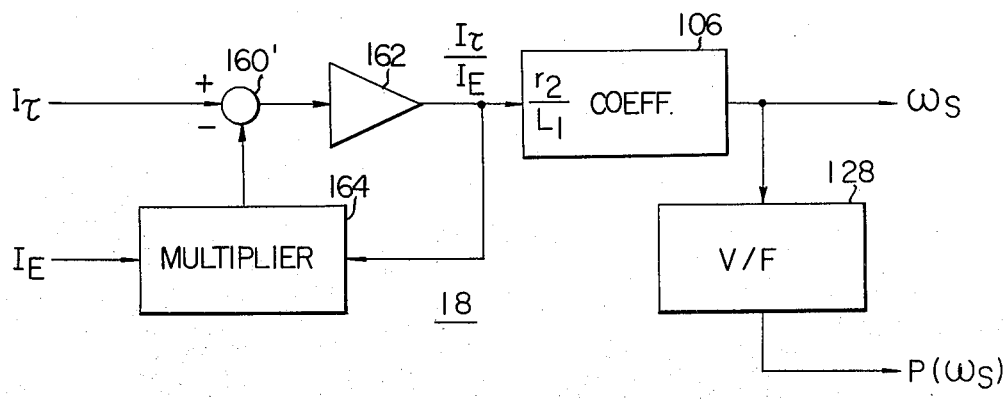
FIG. 15 is a diagram similar to FIG. 13 but illustrating the AC waveform generator shown in FIGS. 2 and 9.

The function generators 28 and 30 and the polyphase AC wavegenerator 32 as shown in FIGS. 2 and 9 and coupled to FIG. 10a may have circuit configurations illustrated in FIGS. 13, 14 and 15 respectively.

In FIG. 13 the first function generator 28 includes two oscillators 130a and 130b for generating two-phase high frequency signals $\phi_1$ and $\phi_2$ respectively and multipliers or modulators 132a and 132b connected to the oscillators 130a and 130b respectively. The multiplier 132a receives the first phase current component $I_E$ and the multiplier 132b receives the second phase current component $I_T$. Both multipliers 132a and 132b are connected at the outputs to an adder 134 subsequently connected to a rectifier or square law detector 136. An output from the rectifier 136 is filtered or smoothed by a filter 138 to provide a command absolute current value $I_M$ in the analog form satisfying the expression (1).

In FIG. 14 an adder 140 receives both a command second phase current component $I_T$ and an output with a negative polarity from a multiplier 142 applied with a command first phase current component $I_E$. The adder 140 has its output connected to an operational amplifier 144 the output of which is connected to the multiplier 142. The components 140, 142 and 144 form a divider that produces $I_T/I_E$ at the output. The output of the operational amplifier 144 is also connected to a nonlinear function generator 146 for generating an inverse tangent of $I_T/I_E$ with the first phase current component $I_E$ remaining unchanged. The function generator 146 produces an output forming an analog signal for a command supplied phase angle $\theta_\tau$.

The analog signal from the function generator 146 is applied to a positive input of an adder 148 including an output connected to a coincidence comparator 150. The comparator 150 includes two outputs $+\epsilon$ and $-\epsilon$ connected to one input of two "AND" gates 152 including the other inputs applied with a train of clock pulses cl. That AND gate 152 connected to the output $+\epsilon$ of the comparator 150 includes an output connected to a count-up input CU of a reversible counter 154 and the other "AND" gate 152 includes an output connected to a count-down input CD of the reversible counter 154. Then the counter 154 is connected to a digital-to-analog concerter 156 subsequently connected to a negative input of the adder 148.

The components 148, 150, 152, 154 and 156 form an analog-to-pulse number converter. The coincidence comparator 150 is operative to cause the reversible counter 154 to count pulses applied thereto by apportioning the clock pulses cl between the inputs CU and CD of the reversible counter 154 after having selectively passed through the two AND gates 152, so as to equal analog output from the converter 156 to the analog output $\theta_\tau$ from the function generator 146. As a result, phase shifted pulses $+P(\theta)$ and $-P(\theta)$ appear at the outputs of the upper and lower "AND" gates 152 as viewed in FIG. 14 and have the abgebraic sum proportional to the command phase angle $\theta_\tau$.

Where the field weaking control or a variation in the first phase current $I_E$ is enabled, the function generator 30 of FIG. 14 effects the calculation of the expression (2) while transforming the command phase angle $\theta_\tau$ to a phase shifted pulses $P(\theta)$.

The AC waveform generator or function generator 32 shown in FIG. 15 can calculate the expression (3) to generate a command slip frequency $\omega_S$. In FIG. 15, an adder 160 has a positive input receiving a command second phase current component $I_\tau$ and an output connected to an operational amplifier 162 that is connected at the output to a multiplier 164 receiving a command first phase current component $I_E$. The multiplier 164 applies an output to a negative input of the adder 160 and cooperates with the adder 160 and the operational amplifier 162 to form a divider. Thus the quotient of the second phase current component $I_\tau$ divided by the first phase current component $I_E$ appears at the output of the operational amplifier 162. That quotient $I_c/I_E$ is also supplied to a proportional coefficient $(r_2/L_1)$ element 164 to provide an analog slip frequency $\omega_S$ at the output of the latter. The analog slip frequency $\omega_S$ is applied to analog-to-pulse number converter 120 to form a pulse signal $P(\omega_S)$ having a pulse repettition frequency proportional to the slip frequency $\omega_S$.

While the present invention has been illustrated and described in conjunction with a few preferred embodiments thereof it is to be understood that numerous changes and modification may be resorted to without departing from the spirit and scope of the present invention.

What is claimed is:

1. An induction motor control system, comprising: an induction motor having a primary winding and short-circuited secondary windings; variable frequency power supply means for supplying an AC signal component to said primary winding, said variable frequency power supply means including a power source and a power converter comprised of solid state switching elements responsive to control signals for controlling conduction of said solid state switching elements; control signal generating means responsive to external signals for generating the control signals for controlling the conduction of said solid state switching elements; speed control means responsive to a command speed input signal for generating a command torque signal; first function generating means responsive to the command torque signal for generating a first command signal corresponding to an amplitude of the AC signal component; second function generating means responsive to the command torque signal for generating a second command signal corresponding to a phase shift angle of the AC signal component; speed sensing means for sensing a speed of said induction motor and for developing a speed signal representative of motor speed; slip frequency control means responsive to the speed signal and the command torque signal for generating a command frequency signal corresponding to a frequency of the AC signal component; and means for supplying the first command signal, the second command signal and the command frequency signal to said control signal generating means.

2. An induction motor control system according to claim 1 further comprising: a command excitation signal generator responsive to said speed signal for generating a command signal and for applying same to said slip frequency control means.

3. An induction motor control system comprising: an induction motor including a primary winding and short-circuited secondary windings; variable frequency power supply means including a power source and a power converter composed of solid state switching elements for supplying an AC component to said primary winding; a waveform generator for generating signals having waveforms for controlling the conduction of said solid state switching elements; a speed controller including a command speed input terminal and an output terminal for generating a command torque signal; a first function generator for generating a first signal corresponding to an amplitude of said AC component in response to said command torque signal; a second function generator for generating a second command signal corresponding to a phase of said AC component in response to said command torque signal; slip frequency control means for generating a command slip frequency signal corresponding to a frequency of said AC component in response to said command torque signal; a speed sensor for sensing the actual speed of said induction motors; and signal transfer means for supplying said first command signal, said second command signal and said actual signal sensed by said speed sensor to said waveform generator.

4. An induction motor control system for supplying an AC current to a primary winding of an induction motor having a shortcircuited secondary conductor, said control system comprising:
an AC variable frequency motor power supply responsive to control signals for supplying a current having a frequency determined by the control signals;
a motor speed detector for generating a speed signal representative of actual motor speed;
comparing means comprising a comparator receptive of the speed signal and receptive of a command signal representative of a reference speed for generating an output signal $I_T$ representative of a difference between the actual motor speed and the reference speed;
means responsive to the motor speed signal for generating an output signal $I_E$ representative of the actual motor speed;
common slip frequency generating means responsive to the signal $I_T$ and the signal $I_E$ for generating an output signal representative of a slip frequency;
adding means comprising an adder circuit for adding the motor speed signal and the command slip frequency generating means output signal and for generating a command angular frequency signal representative of a command angular frequency; and
an AC parameter control circuit for generating control signals and for applying the control signals to said AC variable frequency motor power supply, and AC parameter control circuit comprising a first function generator receptive of the signal $I_T$ and the signal $I_E$ for generating a signal $I_M$, where $$I_M = K_1(I_E^2 + I_T^2)^{\frac{1}{2}}$$

and $K_1$ is a constant, a second function generator receptive of the signal $I_T$ and the signal $I_E$ for generating a signal representative of $\theta_T$, where $$\theta_T = \tan^{-1}(I_T/I_E),$$

and polyphase AC waveforms generating means responsive to the signal $I_M$, the signal $\theta_T$ and the command angular frequency signal for generating control signals and for applying the control signals to said AC variable frequency motor power supply.

5. An induction motor control system for supplying an AC current to a primary winding of an induction motor having a short-circuited secondary conductor, said control system comprising;
an AC variable frequency motor power supply responsive to control signals for supplying a current having a frequency determined by the control signals;
a motor speed detector for generating a speed signal representative of actual motor speed;
comparing means comprising a comparator receptive of the speed signal and receptive of a command signal representative of a reference speed for generating an output signal representative of a difference between the actual motor speed and the reference speed;
command slip frequency generating means responsive to the output signal of said comparing means for generating a slip frequency signal representative of a slip frequency;
adding means comprising an adder circuit for adding the motor speed signal and the slip frequency signal and for generating a command angular frequency signal representative of a command angular frequency; and
an AC parameter control circuit for generating control signals and for applying the control signals to said AC variable frequency motor power supply, said AC parameter control circuit comprising a first function generator receptive of the command angular frequency signal and the comparing means output signal for generating a first voltage signal having a first phase, a second function generator receptive of the command angular frequency signal and the comparing means output signal for generating a second voltage signal having a second phase, a differentiator for differentiating the comparing means output signal, second adding means comprising a second adder circuit for adding the differentiated comparing means output signal and the first function generator output signal and for generating an output signal equal to the sum of the added signals, and polyphase waveform generating means responsive to the second adding means output signal, the second function generator output signal and the command angular frequency signal for generating control signals and for applying the control signals to said AC variable frequency motor power supply.

* * * * *

UNITED STATES PATENT AND TRADEMARK OFFICE
CERTIFICATE OF CORRECTION

PATENT NO. : 4,310,791
DATED : January 12, 1982
INVENTOR(S) : Masahiko AKAMATSU

It is certified that error appears in the above-identified patent and that said Letters Patent are hereby corrected as shown below:

In column 11, equation (15), that part of the equation reading $$\dot{V}_E = (1-M^2/L_1L_2)dI_\tau/dt$$

should read $\dot{V}_E = L_1(1-M^2/L_1L_2)dI_\tau/dt$ , and $$=(L_2/pM^2I_E)(1-M^2/L_1L_2)d_\tau/dt$$

should read $= (L_1/pL_2I_E)(1-M^2/L_1L_2)d\tau/dt$ , and $=K_5(d_\tau/dt)$ should read $= K_5(d\tau/dt)$ In column 11, equation (16), that part of the equation reading $$\int \dot{V}_E dt = (1-M^2/L_1L_2)I = \phi\ell(I_\tau)$$

should read $\int \dot{V}_E dt = L_1(1-M^2/L_1L_2)I_\tau = \phi\ell(I_\tau)$

Column 11, line 34, "$\phi\ell(I_\tau)$" should read --$\phi_\ell(I_\tau)$--

Signed and Sealed this

Twenty-sixth Day of October 1982

[SEAL]

Attest:

GERALD J. MOSSINGHOFF

Attesting Officer    Commissioner of Patents and Trademarks